(12) United States Patent
Nouwynck et al.

(10) Patent No.: US 6,283,508 B1
(45) Date of Patent: Sep. 4, 2001

(54) DYNAMIC KNEE PROTECTION DEVICE

(75) Inventors: Stéphane Nouwynck, Niedernberg (DE); Denis Tostain, Cergy-le-Haut (FR)

(73) Assignees: BSRS Restraint Systems GmbH (DE); Allibert Industrie (FR)

( * ) Notice: Subject to any disclaimer, the term of this patent is extended or adjusted under 35 U.S.C. 154(b) by 0 days.

(21) Appl. No.: 09/173,351

(22) Filed: Oct. 15, 1998

(30) Foreign Application Priority Data

Oct. 27, 1997 (DE) .............................................. 197 47 423

(51) Int. Cl.⁷ .................................................. B60R 21/04
(52) U.S. Cl. ............................................................ 280/753
(58) Field of Search ..................................... 280/751, 752, 280/753, 748, 730.1; 180/90; 296/70

(56) References Cited

U.S. PATENT DOCUMENTS

| 2,654,616 | * | 10/1953 | Mockli | 280/751 |
| 2,749,143 | * | 6/1956 | Chika | 280/751 |
| 4,023,643 | * | 5/1977 | Bagley, Jr. | 280/753 |
| 4,417,750 | * | 11/1983 | Burry | 280/753 |
| 4,700,974 | * | 10/1987 | Andres et al. | . |
| 4,951,963 | * | 8/1990 | Behr et al. | 280/753 |
| 5,005,863 | * | 4/1991 | Drefahl | 280/777 |
| 5,131,681 | * | 7/1992 | Wetzel et al. | 280/753 |
| 5,190,314 | * | 3/1993 | Takasugi | 280/752 |
| 5,344,184 | * | 9/1994 | Keeler et al. | 280/730.1 |
| 5,476,283 | * | 12/1995 | Elton | 280/753 |
| 5,482,319 | * | 1/1996 | Yoshimura et al. | 280/752 |
| 5,496,066 | * | 3/1996 | Hoffmann et al. | 280/753 |
| 5,536,043 | * | 7/1996 | Lang et al. | 280/753 |
| 5,775,729 | * | 7/1998 | Schneider et al. | 280/730.1 |
| 5,797,620 | * | 8/1998 | Eyerainer | 280/730.1 |
| 6,053,532 | * | 4/2000 | Wilkens et al. | . |

FOREIGN PATENT DOCUMENTS

| 2756401 | * | 8/1978 | (DE) | 280/753 |
| 41 12 579 A1 | | 10/1991 | (DE) | . |
| 43 28 446 A1 | | 3/1995 | (DE) | . |

* cited by examiner

Primary Examiner—Brian L. Johnson
Assistant Examiner—Britton Michael
(74) Attorney, Agent, or Firm—Akin, Gump, Strauss, Hauer & Feld, L.L.P.

(57) ABSTRACT

A knee protection device (1) for a person (2) sitting on a seat arranged inside a motor vehicle is provided in the case of an accident-related deformation of the leg space. The device has a load distribution plate (3) which is driven instantaneously from its rest position in the direction toward the knee parts of the person (2), upon activation of the trigger device attached to it. The trigger device may be a pyrotechnic device (4) of the type used for a safety belt attached to the seat.

9 Claims, 6 Drawing Sheets

DYNAMIC KNEE PROTECTION DEVICE

BACKGROUND OF THE INVENTION

The invention involves a knee protection device for a person sitting on a seat arranged inside a motor vehicle, in case of an accident-related deformation of the leg space.

A safety device of this type is known from German published patent application DE-A-43 28 446, for example. In that application there is provided a padded board attached to a guide, which is movable by a drive mechanism, essentially in the direction toward the knees of the vehicle passenger, during a crash impact. In this publication it is proposed that a leaf spring, which is firmly harnessed in the vehicle and connected to the padded board, is pre-tensioned in the rest position and releasable opposite to the driving direction of the vehicle, for use as the drive mechanism.

This design entails several serious disadvantages. For example, there are space problems due to a leaf spring which is to be made with relatively large dimensions in order to generate greater forces. Therefore, the design is certainly applicable for the passenger side in a motor vehicle, but not however for the driver's side, where the steering column and the pedal structure are in the way. Furthermore, the construction space is relatively large and the material costs for the leaf spring are too high for the design to be used in the intermediate range of motor vehicles as well.

BRIEF SUMMARY OF THE INVENTION

In view of this background, an object of the present invention is to further develop a knee protection device of the given type so that the problems mentioned do not occur. This object is solved by a knee protection device according to the present invention, wherein the knee protection device also makes use of a load distribution plate which is driven instantaneously from its rest position in the direction toward the knee parts of the person, in case of activation of the trigger device attached to it, and wherein a pyrotechnic device functions as the actuator.

The prerequisite is thus the presence of a pyrotechnic device which, however, is becoming more and more accepted in motor vehicle construction, for example in the form of a belt-tightening device. Using the locationally fixed belt-tightening device, the load distribution plate can be driven instantaneously in the direction toward the knee part of the motor vehicle passengers via a tension cable, for example. There, it meets the knees of the motor vehicle passenger and holds them back. The structural size of the knee protection device according to the invention is relatively small, since the pyrotechnic device is relatively small, and the load distribution plate can be integrated into the dashboard. By the use of a pyrotechnic device as an actuator, enormously short reaction times can be realized, so that the retaining effect of the load distribution plate can be correspondingly high.

According to an advantageous further embodiment, it is provided that the load distribution plate is held and guided by guide rods, wherein these guide rods consist, at least partially, of energy-absorbing deformation elements. Usually, the guiding parts of the guide rods are guided by a cross strut of the dashboard onto which the energy-absorbing section connects. In case of an impact, the load distribution plate in this embodiment is first moved instantaneously, upon the trigger signal, in the direction toward the knee parts of the motor vehicle passenger. The motor vehicle passenger, tends to move forward because of the impact, and contact the load distribution plate. After contact with the load distribution plate, portions of the kinetic energy are then absorbed by the deformation elements, for example, in which the deformation elements are compressed under considerable expenditure of force.

Especially advantageous is an embodiment in which the load distribution plate is constructed from the flap and the frame of a glove compartment. The glove compartment itself extends away from the motor vehicle interior and, in the rest condition of the system, is covered by the flap and the frame. Upon activation of the load distribution plate made of the flap and frame, the glove compartment stays in its position. From this, the advantage results that only relatively small masses must be accelerated in case the system is triggered.

Under the prerequisite of the presence of certain recognition systems, for example for the size, position, and weight of the motor vehicle passenger on the respective seat, it is advantageously provided that the drive path of the load distribution plate, when the system is triggered, is made adaptable to the respective body size of the person by means of multi-level actuators. The actuator therefore has the possibility of controlling its stroke depending on the sensory finding.

In principle, the drive path of the load distribution plate is the same size as the stroke of the actuator in the previously mentioned embodiments. According to an advantageous further embodiment, however, the drive path can differ from the stroke of the actuator, using a cable/pulley system or a lever system, and can be adapted to the spatial conditions of the leg space.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred, wherein equivalent parts are indicated with the same reference numerals. It should be understood, however, that the invention is not limited to the precise arrangements and instrumentalities shown. In the drawings.

DETAILED DESCRIPTION OF THE INVENTION

Figure 1:
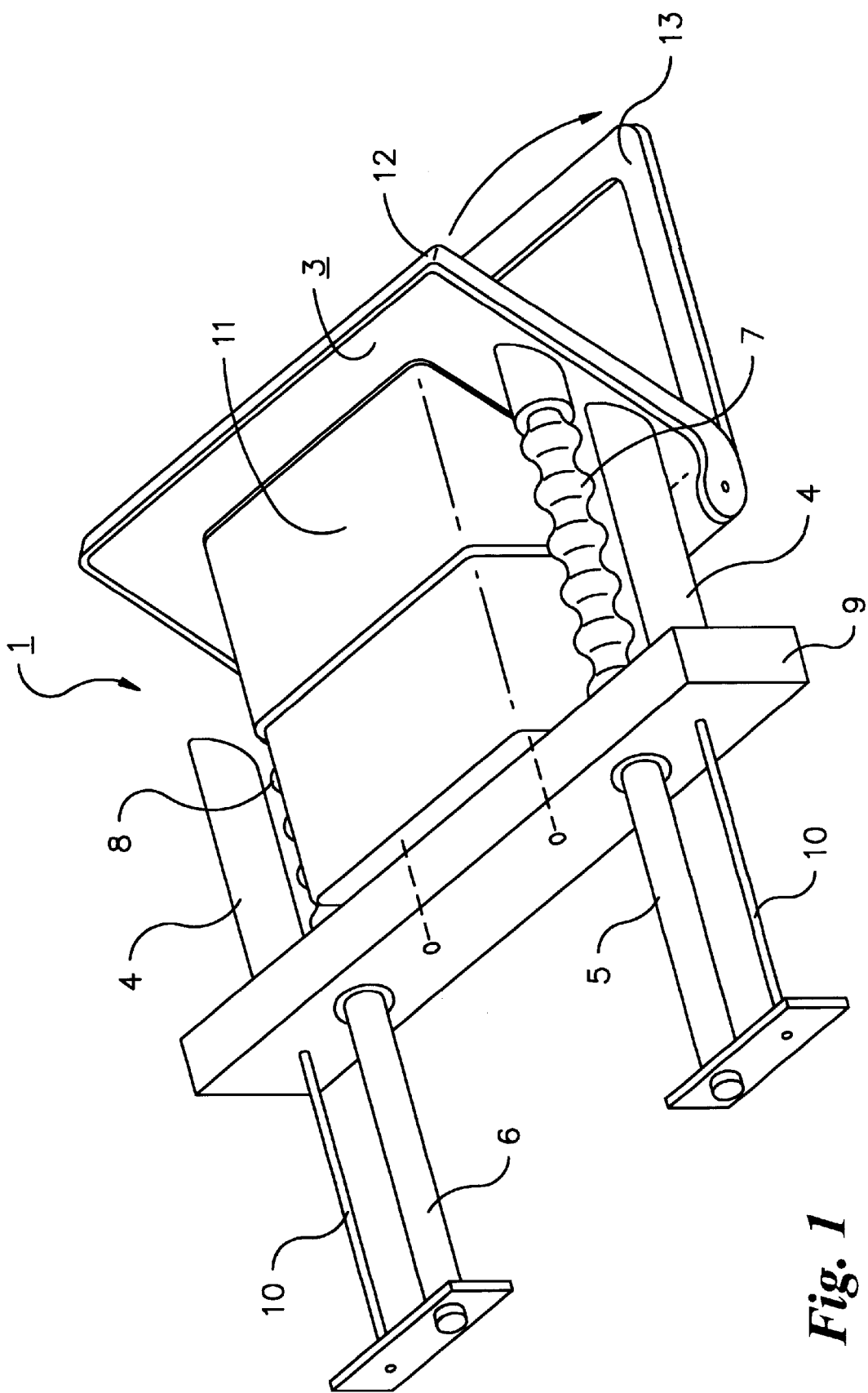
FIG. 1 is a perspective schematic view of the knee protection device in the rest condition.

FIG. 1 provides a preliminary overview of a knee protection device 1. It shows a cross strut 9 in the dashboard of the motor vehicle. Guided through this are the guide rods 5 and 6 and the traction cables 10 of an actuator or trigger, presented here as a belt-tightening device 4 preferably in the form of a pyrotechnic-type seat belt retractor. On the inside of the vehicle and connected onto the guide rods are sections 7 and 8, respectively, which consist of energy-absorbing deformation elements. These are connected at their ends to the load distribution plate 3, which is here advantageously formed by the flap 13 and the frame 12 of a glove compartment 11.

Figure 2A:
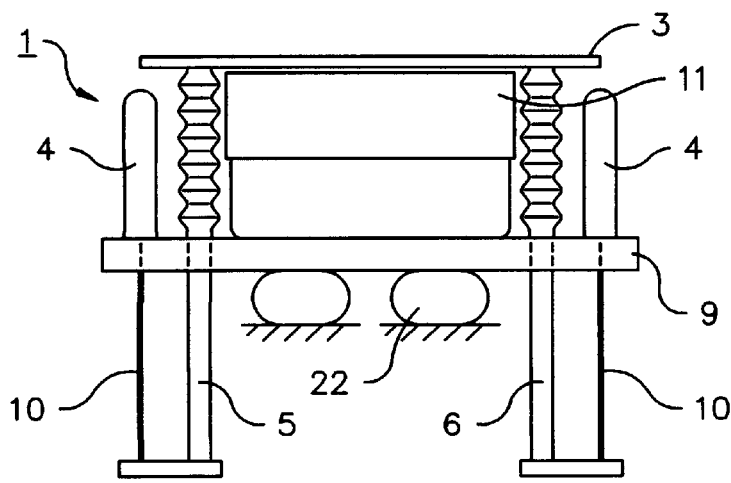
FIG. 2a is a view of the device from above in the rest condition.

The functional progression of the knee protection device is explained using FIG. 2. The rest condition according to FIG. 1 is depicted again from above in FIG. 2a. Recognizable herein is the connection 22 of the cross struts 9 to the vehicle frame.

Figure 2B:
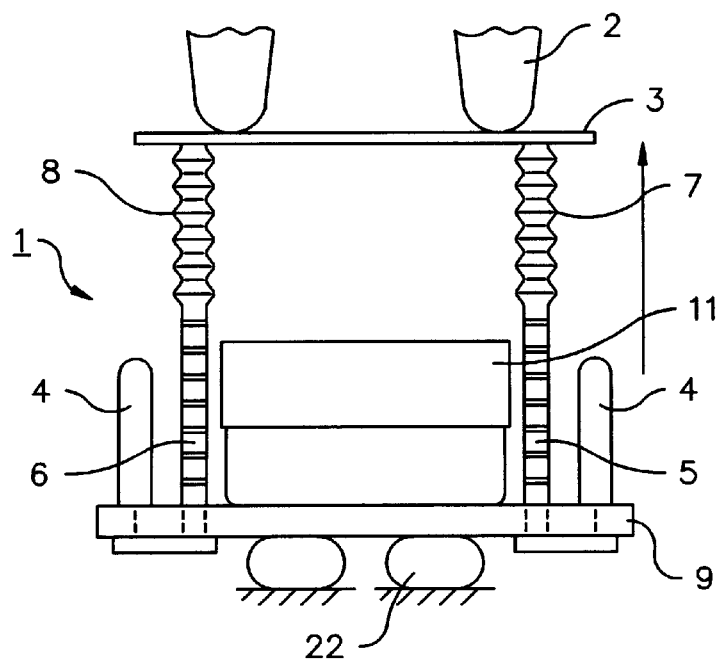
FIG. 2b shows the device from above after triggering of the actuator.
Figure 2C:
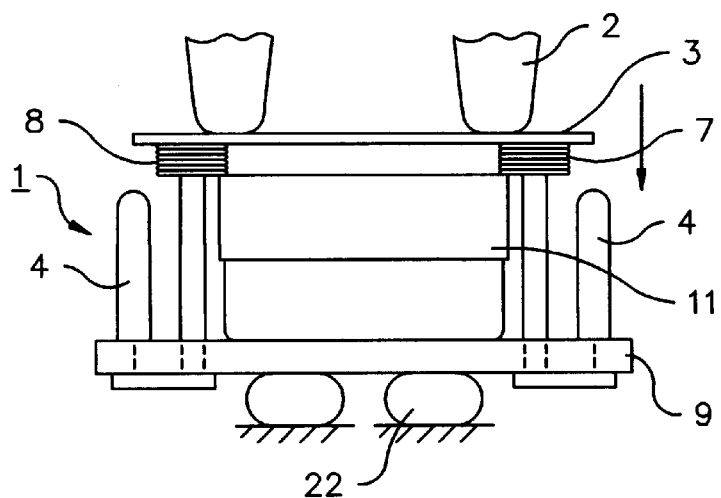
FIG. 2c shows the condition of the device after contact of the motor vehicle passenger with the load distribution plate and after absorption of the kinetic energy by the deformation elements.

Upon a trigger signal, the belt-tightening device 4 is activated, such that by the cables 10 the guide rods 5 and 6 are pushed rearwardly (of the vehicle) through the cross struts 9, i.e., toward the top in FIG. 2b. This occurs instantaneously since the belt-tightening device 4 is activated pyrotechnically.

The load distribution plate 3 is, as a consequence, likewise moved rearwardly in the direction toward the vehicle passengers. The knees 2 of the person thereby come into contact with the load distribution plate 3. A further, forward-pressing movement of the knees (FIG. 2c) leads to compression of the energy-absorbing deformation elements 7 and 8.

Figure 3:
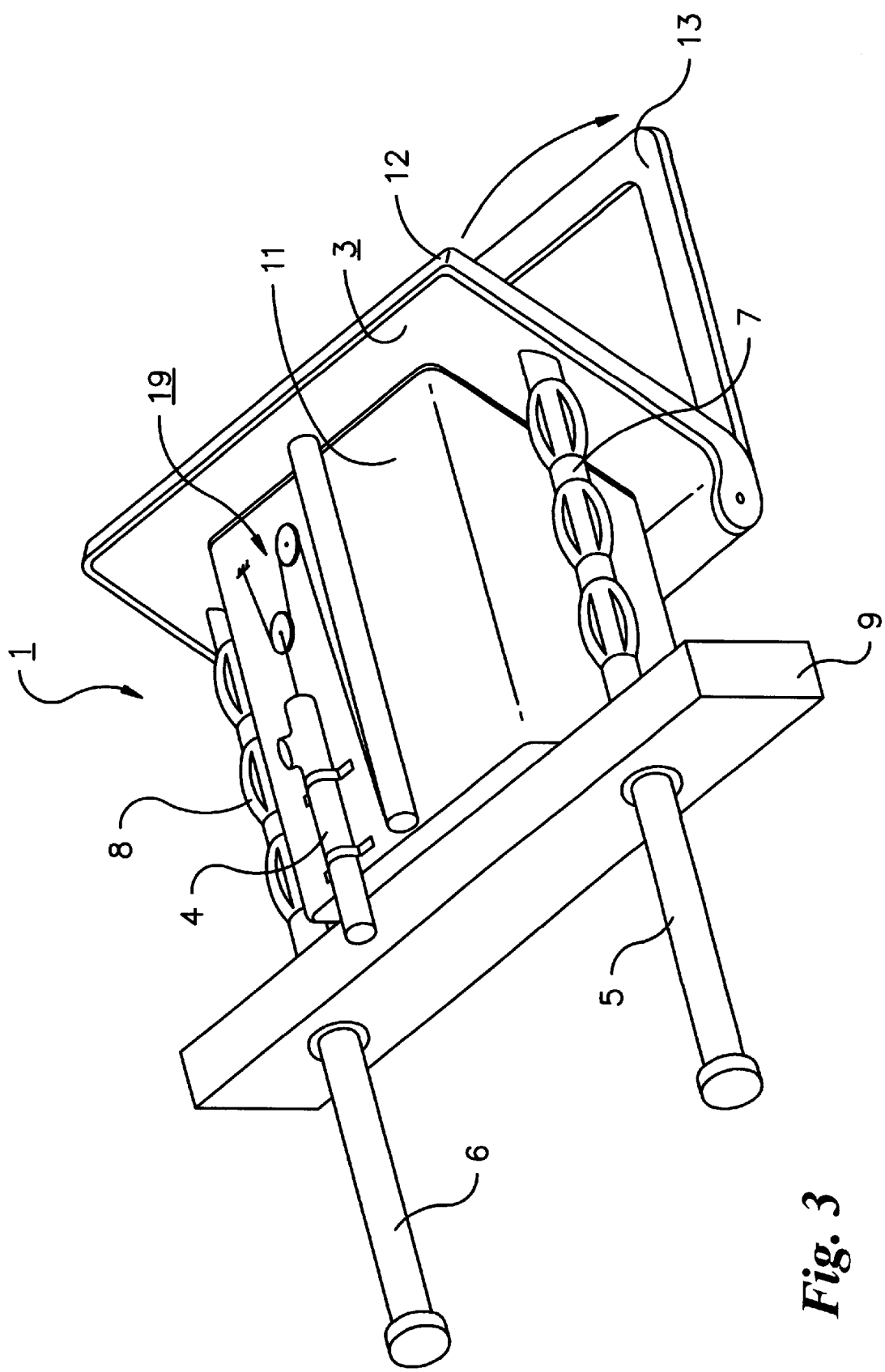
FIG. 3 is a similar view of the knee protection device as in FIG. 1, however with a cable/pulley system.

FIG. 3 shows a similar view of a system as depicted in FIG. 1. Here, though, for the adaptation of the drive path of the load distribution plate 3 to the spatial conditions in the interior of the motor vehicle and, in particular, to the leg space, an actuator in the form of a cable/pulley system 19 is connected between the belt-tightening device 4 and the load distribution plate 3. Depending on the layout of the pulley system 19, the drive path of the load distribution plate 3 can thus be shortened or lengthened in relation to the stroke of the belt-tightening device 4.

Figure 4:
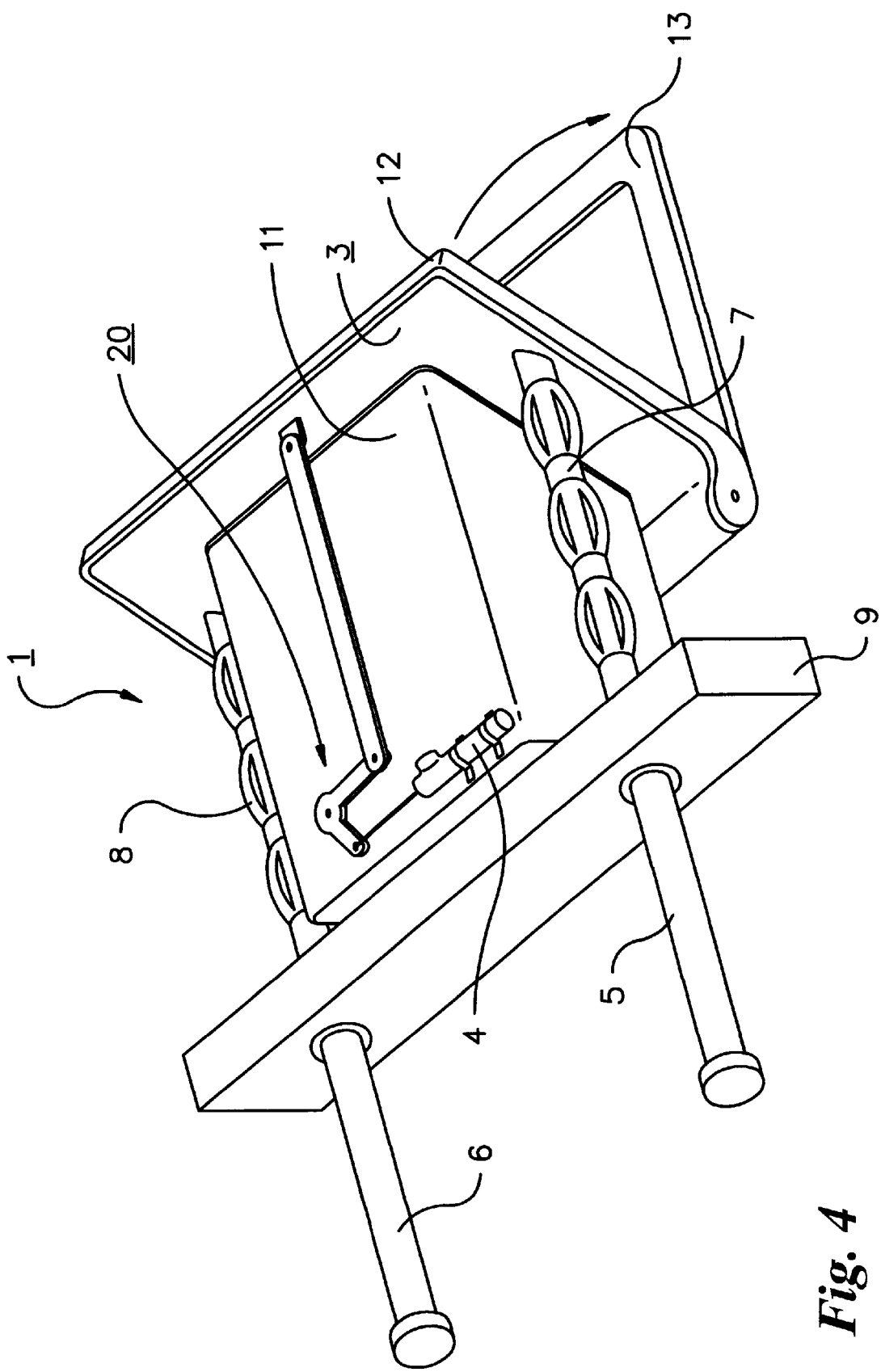
FIG. 4 shows a knee protection device having a lever system.

FIG. 4 shows a similar view as FIG. 3. As the device for changing the drive path of the load distribution plate 3, in contrast to the embodiment according to FIG. 3, here an actuator in the form of a lever system 10 is connected between the belt-tightening device 4 and the load distribution plate 3. This device also functions for adaptation of the drive path of the load distribution plate 3 to the spatial conditions.

It should not go unmentioned that the knee protection device according to the invention can also perform a passive protection function, even if the belt-tightening devices 4 are not triggered. Here, in case of a collision, the passenger would be pressed forwardly with his knees, until his knees contact the load distribution plate 3. The kinetic energy is then (partially) passively used up in the deformation elements 7 and 8, whereby the deformation elements are compressed.

Figure 5A:
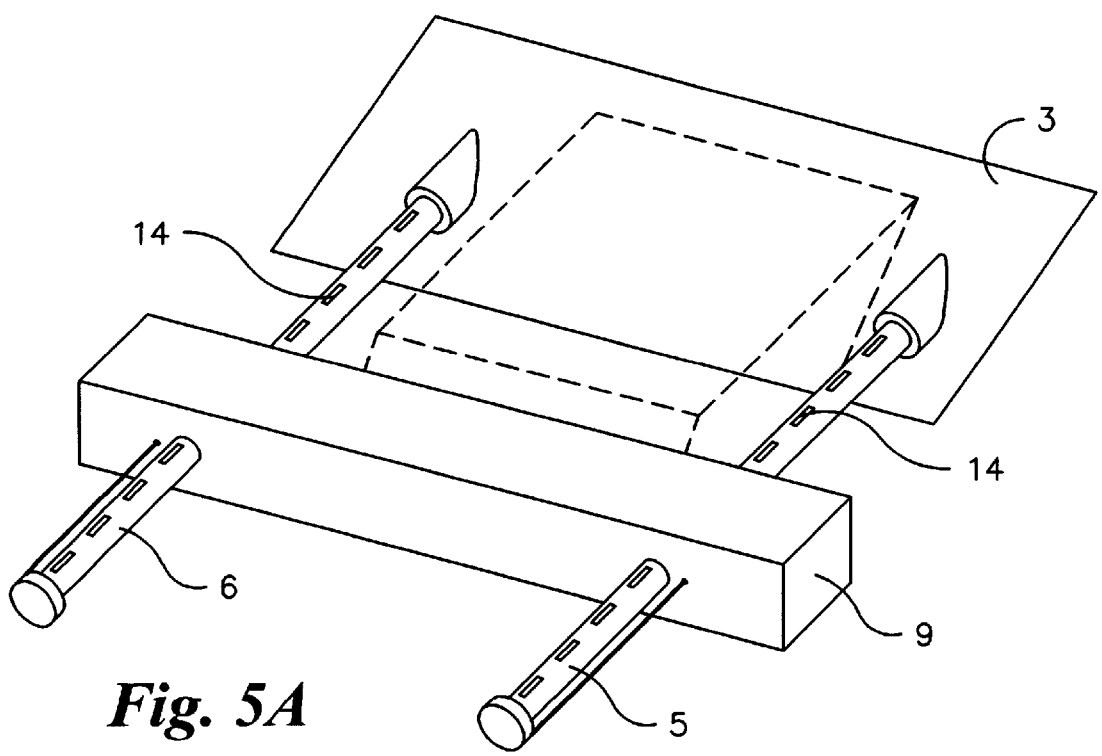
FIG. 5a is a perspective schematic view of a knee protection device having a different energy-absorbing system.
Figure 5B:
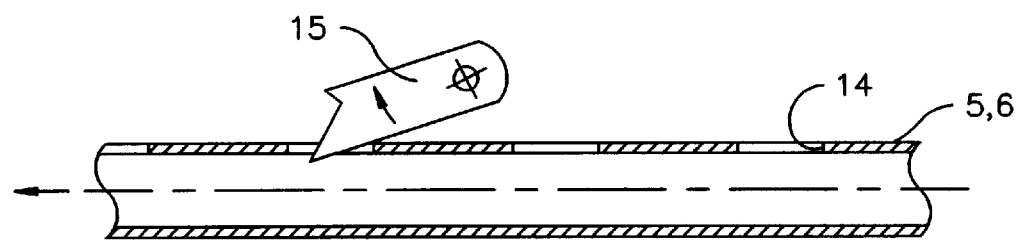
FIG. 5b is a partial longitudinal sectional view of the guide rods of FIG. 5a after triggering of the knee protection device.
Figure 5C:
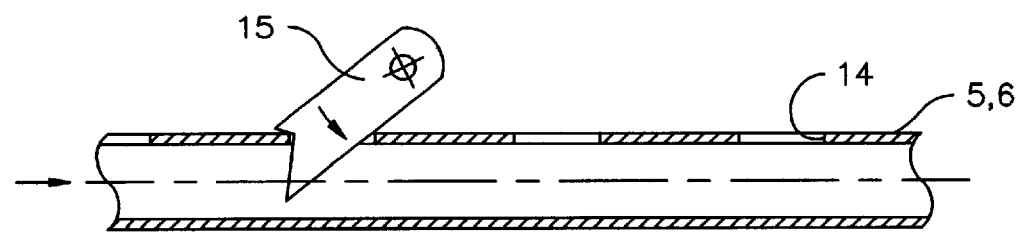
FIG. 5c is a longitudinal sectional view as in FIG. 5b after contact of the load distribution plate with the knees of a passenger.

FIG. 5 shows a similar view of a knee protection device as in FIG. 1, but with several modifications. As presented here, only the differences from the systems described up to now are dealt with.

Clearly recognizable here are the elongated slots 14 in the guide rods 5 and 6. The elongated slots 14 are provided so that blade-shaped stoppers 15 can engage the slots 14 in order to absorb energy in case of a collision. After triggering of the knee protection device (FIG. 5b), the guide rods 5 and 6 are first guided into the leg space of the motor vehicle, to the left in FIG. 5b. The arrangement is such that the stopper 15 does not inhibit this movement. The stopper 15 and the slots 14 form a quasi-ratchet system. After contact of the load distribution plate 3 by the knees of the motor vehicle passenger, the system experiences a load reversal (FIG. 5c), which causes the stopper 15 to engage one of the slots 14 and to become locked in its blocking position. The blade-shaped stopper 15 cuts the wall of the guide rods 5 and 6 under a high expenditure of energy. The mechanism of the stopper and its bearings can, for example, be arranged in the cross strut 9.

Figure 6A:
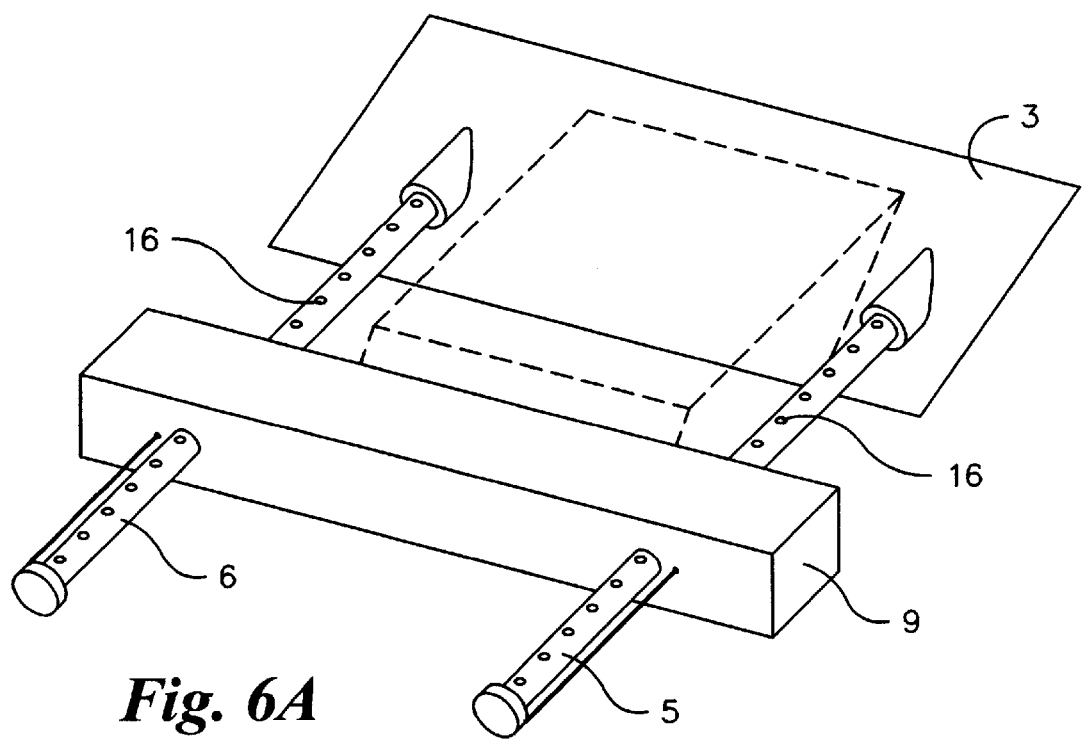
FIG. 6a is a perspective schematic view of a knee protection device having another different energy-absorbing system.
Figure 6B:
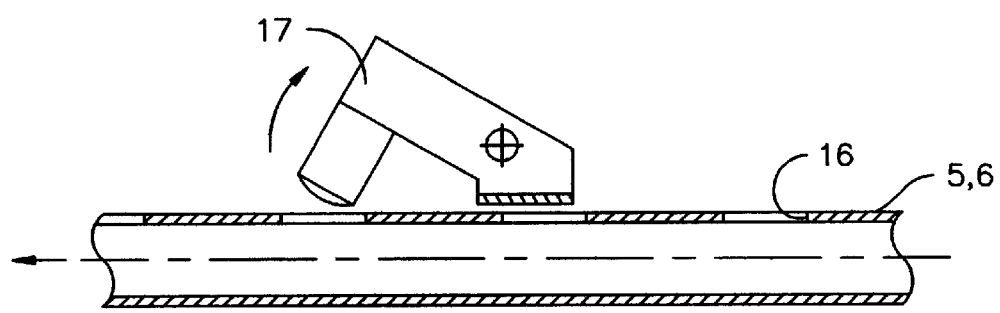
FIG. 6b is a partial longitudinal sectional view of the guide rods of FIG. 6a after triggering of the knee protection device.
Figure 6C:
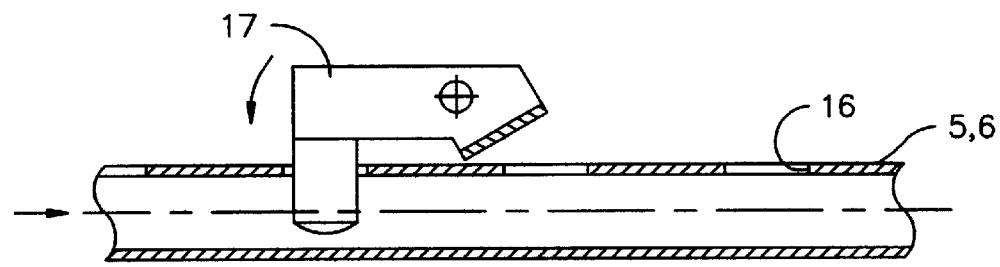
FIG. 6c is a longitudinal sectional view as in FIG. 6b after contact of the load distribution plate with the knees of a passenger.

FIG. 6 shows a system which is slightly modified in relation to FIG. 5. Here, in the guide rods 5 and 6, openings 16 are provided in which, after the system has been triggered (FIG. 6b) and the opposing force has acted through the knees on the load distribution plate (FIG. 6c), pin stoppers 17 engage the openings 16, such that the pins then penetrate the tube walls of the guide rods 5 and 6 under a high energy expenditure, whereby the energy accruing is for the most part eliminated.

By this design according to the invention, a cost-effective, space-saving, but highly effective knee protection device can be realized, which does not have the problems of known and comparable devices.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A knee protection device (1) for a person (2) sitting on a seat arranged in a motor vehicle interior for inhibiting forward movement of the knees of a person (2) during an accident, the knee protection device (1) comprising: a load distribution plate (3) having a first side which is adapted to face the person and a second side which is adapted to face away from the person, the load distribution plate being held and guided by guide rods (5, 6) comprising at least partially energy-absorbing deformation elements (7, 8) operatively associated with the second side of the load distribution plate (3), said trigger device (4) instantaneously driving the load distribution plate from a rest position in a direction toward the knees of the person (2) upon activation of the trigger device, wherein the trigger device comprises a pyrotechnic. device (4).

2. The knee protection device according to claim 1, wherein the trigger device comprises a belt-tightening device (4).

3. The knee protection device according to claim 1, wherein the load distribution plate (3) comprises a flap (13) and a frame (12) of a glove compartment (11).

4. The knee protection device according to claim 1, further comprising an actuator connected between the pyrotechnic device and the driver plate for adapting a travel distance of the load distribution plate (3) to the sparial conditions of the leg space of a particular vehicle type.

5. The knee protection device according to claim 4, wherein the actuator comprises a cable/pulley system (19) which adapts the travel distance of the load distribution plate (3) to the spatial conditions of the leg space.

6. The knee protection device according to claim 4, wherein the actuator comprises a lever system (10) which adapts the travel distance of the load distribution plate (3) to the spatial conditions of the leg space.

7. The knee protection device according to claim 1, further comprising a supplemental mechanical system (14, 15; 16, 17) for eliminating energy acting on the load distribution plate (3) in case of a collision.

8. The knee protection device according to claim 7, wherein the supplemental system comprises openings (14; 16) in the guide rods (5,6) and stoppers (15; 17) which engage with the openings (14; 16).

9. A knee protection device (1) for a person (2) sitting on a seat arranged in a motor vehicle interior for inhibiting forward movement of the knees of a person during an accident, the motor vehicle having a cross support adjacent the leg space, the knee protection device (1) comprising: a load distribution plate (3); guide rods (5, 6) adapted for sliding connection to the cross support, one end of each guide rod being connected to the load distribution plate (3) to thereby guide movement of the load distribution plate, a deformation element (7, 8) that is at least partially energy-absorbing operatively connected between the load distribution plate and each guide rod; and trigger device (4) being operatively connected to the load distribution plate (3), said trigger device (4) instantaneously driving the load distribution plate under guided movement from said guide rods with respect to the cross support from a rest position in a direction toward a knee of the person (2) upon activation of the trigger device (4).

* * * * *